United States Patent [19]
Köhler et al.

[11] Patent Number: 5,800,947
[45] Date of Patent: Sep. 1, 1998

[54] GASTIGHT, SEALED ALKALINE STORAGE BATTERY IN THE FORM OF A BUTTON CELL

[75] Inventors: Uwe Köhler, Kelkheim; Christoph Klaus, Ellwangen; Günter Hofmann, Hofheim; Frank Lichtenberg, Zeiskam, all of Germany

[73] Assignee: Varta Batterie Aktiengellschaft, Hanover, Germany

[21] Appl. No.: 506,834

[22] Filed: Jul. 25, 1995

[30] Foreign Application Priority Data

Jul. 29, 1994 [DE] Germany ............... 44 26 970.6

[51] Int. Cl.$^6$ .................. H01M 4/32; H01M 4/30
[52] U.S. Cl. ................ 429/223; 429/206; 29/623.1
[58] Field of Search .................. 429/223, 218, 429/206; 29/623.1

[56] References Cited

U.S. PATENT DOCUMENTS

| | | | |
|---|---|---|---|
| 3,640,772 | 2/1972 | Falk et al. | 137/67 |
| 4,782,584 | 11/1988 | Mohri et al. | 29/623.1 |
| 4,844,999 | 7/1989 | Oshitani et al. | |
| 4,985,318 | 1/1991 | Oshitani et al. | |
| 5,004,657 | 4/1991 | Yoneda et al. | 429/192 |
| 5,281,494 | 1/1994 | Ettel et al. | 429/223 |
| 5,366,831 | 11/1994 | Watada et al. | 429/223 |
| 5,405,714 | 4/1995 | Teresaka et al. | 429/223 |
| 5,498,403 | 3/1996 | Shin | 423/592 |
| 5,506,076 | 4/1996 | Miyamoto et al. | 429/223 |

OTHER PUBLICATIONS

Züttel, et al., *Effect of Partial Substitution of Nickel in AB$_2$-Type Zr-Ni Alloys by V, Cr and Mn on the Surface- and Bulk-Properties in View of Battery Applications*, "International Journal of Research in Physical Chemistry and Chemical Physics", vol. 183, pp. 1395 et seq. (1994) (no month).

Sakai, et al., *Hydrogen Storage Alloys for Nickel-Metal Hydride Battery*, "International Journal of Research in Physical Chemistry and Chemical Physics", vol. 183, p. 1372 et seq. (1994) (no month).

*Primary Examiner*—Prince Willis, Jr.
*Assistant Examiner*—Carol Chaney
*Attorney, Agent, or Firm*—Weiser and Associates, P.C.

[57] ABSTRACT

A Ni/Cd or Ni/hydride storage battery of the button cell type has a positive electrode tablet based on a nickel hydroxide powder having an active mass comprised of spherical particles with a high pycnometric density (d>3.5 g/cm$^3$). In contrast to conventional nickel hydroxide powders having irregular particles, a better space utilization is achieved during dry pressing due to a narrow particle-size distribution having a maximum in a range of from 5 to 20 μm, and due to the rounded particle surfaces. The specific volumetric capacity of the resulting button cell electrode is consequently approximately 25% higher than that of a conventional positive button cell electrode. A microporous separator having pore sizes smaller than the mean diameter of the spherical particles prevents the danger of short circuits.

19 Claims, 2 Drawing Sheets

GASTIGHT, SEALED ALKALINE STORAGE BATTERY IN THE FORM OF A BUTTON CELL

BACKGROUND OF THE INVENTION

The present invention relates to gastight, sealed alkaline storage batteries in the form of a button cell, having positive and negative electrodes disposed in a cell casing with an appropriate separator.

The casing of a button cell is generally comprised of a basin-shaped lower section and a corresponding lid, preferably formed of nickel-plated sheet steel. The lower section receives the positive electrode, followed by an alkaline-resistant separator formed of a plastic material, and the negative electrode (situated on the separator). The electrodes and the separator are impregnated with electrolyte. A spring is situated between the negative electrode and the lid to produce an intimate contact between the electrodes and with the cell casing (or container). A plastic ring is provided to insulate the lower section and the lid from one another upon assembly. A perfectly sealed closure is achieved by then flanging the rim of the lower section over the perimeter of the lid and squeezing the resulting assembly together.

Apart from their special construction (distinguishing button cells from cylindrical cells), button cells are always designed for low capacities (i.e., of up to about 1 Ah). Due to their small overall size, such button cells find versatile use in the electronics industry.

The electrodes of button cells are typically mass electrodes, based on a dry mixture of appropriate active materials. Nickel hydroxide is often used for the positive electrode, with optional additions of a conducting agent and a binder. Pressed powder tablets are produced from the resulting dry mixture. Finally, as is known from button cells of the Ni/Cd type, the powder tablets are then pressed into a small basket of nickel wire gauze for the purpose of reinforcing the compaction of the mass and for improved current collection.

To meet the needs of present practical applications, the progressive miniaturization of such button cells has become necessary. This has imposed correspondingly higher requirements on the electrochemical storage capacity of such cells, per unit volume. As a consequence, the Ni/Cd and Ni/metal hydride button cells which are currently available have come up against a limit as to their possibilities relative to their volumetric energy density. Primarily, this is due to the fact that the nickel hydroxide which is used, because of its particle size and its particle distribution, permits a mass utilization of only about 80% of its theoretical value (namely, approximately 230 mAh/g as compared with 289 mAh/g). Correspondingly, the cell's volumetric utilization (based on the electrode volume) has values of only approximately 300 mAh/cm$^3$.

The nickel hydroxide powder which is presently used in button cells is obtained from a precipitation and drying process. An initially lumpy material results, which yields a powder having a particle size distribution of 30 to 300 μm following grinding. The production of positive button cell electrodes further requires, in addition to nickel hydroxide as the active electrode mass, additions having a mean particle size of 1 to 5 μm. This is significantly below the particle sizes for the nickel hydroxide particles. As a result, a uniform density distribution of all such components (as a result of mixing and subsequent compacting by pressing) is difficult.

U.S. Pat. Nos. 4,844,999 and 4,985,318 disclose a nickel hydroxide powder useful for paste electrodes. The disclosed powder is said to have a total pore volume of only 0.05 ml/g, and pore radii of between 15 and 30 Å. A comparatively high density, and fine division of this known material can be inferred from these values, and from the specific surface of 15 to 30 m$^2$/g which is identified.

Experience has shown that an increase in mass utilization can be achieved by the post-grinding of a conventional nickel hydroxide powder to particle sizes of less than 20 μm. This acts to distribute the powders admixed for the purpose of electron collection more finely and more uniformly. As a result, electronic binding of the Ni(OH)$_2$ mass particles is enhanced and, additionally, those regions in the electrode which were not otherwise accessible to electron transfer are made accessible. At the same time, however, other disadvantages must be accepted.

SUMMARY OF THE INVENTION

It is therefore the primary object of the present invention to provide an alkaline button cell, especially of the Ni/hydride system, which has a markedly improved storage capacity when compared with currently commercially available button cells of the same construction.

This and other objects are achieved in accordance with the present invention by providing a nickel hydroxide powder which has spherically shaped particles which exhibit a high solid-state density, and which is pressed in a dry state to form the active material for the positive electrode.

A further discussion of button cell storage batteries having positive electrodes composed of spherical nickel hydroxide powder is provided below, taken in conjunction with the following illustrations.

DETAILED DESCRIPTION OF THE PREFERRED EMBODIMENTS

Figure 1:
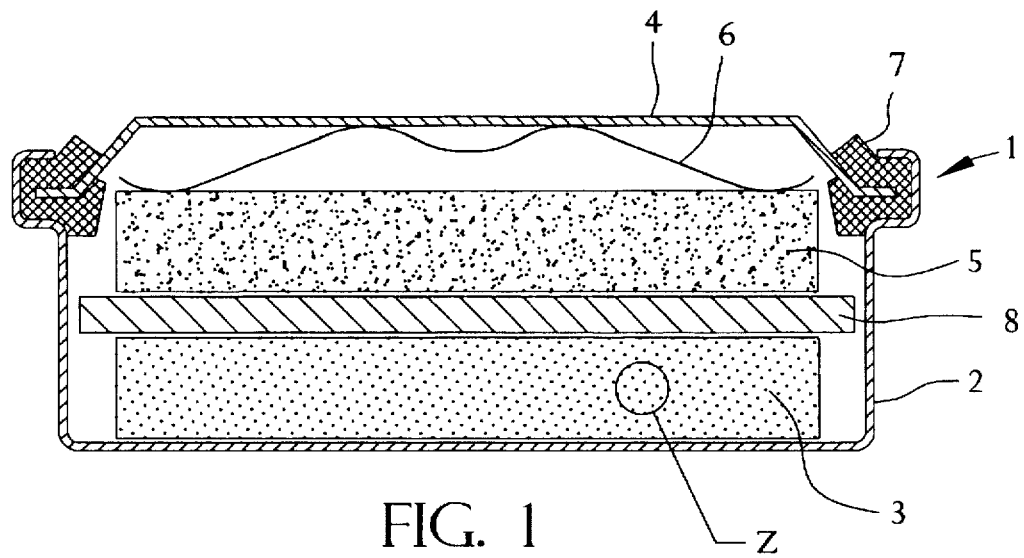
FIG. 1 is a cross-sectional view of a Ni/hydride storage battery produced in accordance with the present invention.

In accordance with the present invention, the nickel hydroxide powder used to form the positive electrode of a button cell (such as a Ni/hydride button cell) is comprised of spherical particles to yield a high solid-state density. The pycnometric density of the nickel hydroxide powder is preferably above 3.3 g/cm$^3$, with an upper limit of 3.9 g/cm$^3$. Most of the particle sizes are distributed over a range of from 5 to 20 μm, and in the most favorable case, over a range of from 10 to 15 μm. As a result, the particle sizes exhibited are virtually of the same order of magnitude as the particle sizes of the additives previously mentioned (i.e., from 1 to 5 μm). Consequently, when mixed with the latter, a more homogeneous distribution and a better space utilization are achieved.

Hydrogen storage alloys such as those of the LaNi$_5$ type or the TiNi type are particularly useful as negative electrode materials for the Ni/hydride button cells of the present invention. Especially preferred are alloys of the LaNi$_5$ type, in which lanthanum and/or other rare-earth elements form the misch metal component of an MmNi$_5$ alloy. An exemplary alloy has the composition MmNi$_{4.3-x}$Co$_x$Mn$_{0.3}$Al$_{0.4}$, where $0.2<x<0.7$.

In addition to nickel hydroxide, typical mass mixtures for the positive electrode contain metallic nickel and cobalt, or graphite and cobalt oxide. These additives predominantly act as conducting material. Cobalt oxide additionally provides for an increase in the oxygen overvoltage at the positive electrode, and consequently, an increase in charging efficiency.

In order to improve the mechanical strength of the resulting tablet when the dry mass is pressed, a powdered plastic binder is advantageously added to the mixture. Examples of useful binder materials include polytetrafluoroethylene (PTFE), polyethylene (PE), polypropylene (PP) or polyvinylidene fluoride (PVDF).

The following constitutes a typical mass mixture for achieving the improvements of the present invention:

3 to 10% by weight of CoO;

2 to 10% by weight of Co$_{met.}$;

20 to 50% by weight of Ni$_{met.}$; and 0.5 to 3% by weight of a plastic binder.

The remainder, to 100% by weight, is comprised of Ni(OH)$_2$. The content of the Ni(OH)$_2$ component can vary in a range of from about 40% by weight to about 70% by weight.

Because the nickel hydroxide has a spherical particle shape and a simultaneously high solid-state density (preferably >3.5 g/cm$^3$), it is possible in accordance with the present invention to achieve a high packing density. This is due to the uniform and smooth particle surfaces which are present, and due to the optimum particle size distribution which is achieved.

It is particularly advantageous to granulate the above described mass mixtures before they are dry pressed into tablets to promote their subsequent processing. As a result, mass conglomerates are produced which have a particle size of from 100 μm to 1000 μm, and which can be excellently dispensed because of their ability to flow. In addition, such larger particles prevent mass leakage (resulting in loss), as a slurry from the cell's small nickel-gauze basket. The danger of penetration into the separator is also reduced.

Similar success cannot be achieved with a commercial nickel hydroxide powder (having particle sizes of from 50 to 300 μm), even if the latter is post-ground to a particle fineness of approximately 20 μm. This is because the particles of the post-ground product will still have irregular surfaces, with the result that such particles will tend to resist optimum filling of the available space during compaction. As a result, the ability to use a post-ground positive mass made from coarse-grained standard materials for electrodes having a high density and a high capacity per unit volume remains limited.

A certain increase in mass utilization is possible as a result of the previously described post-grinding of standard nickel hydroxide powder. The spacing between the electrochemically active portions and the metallic conducting matrix becomes smaller, and the load-carrying capacity is consequently improved following such production of the electrode mass. However, for cells containing such a nickel hydroxide powder, with a particle spectrum of from 50 to 300 μm, an irreversible decline in capacity sets in if the cells are stored under short-circuit conditions for a prolonged period, particularly at high temperatures. This loss in capacity is absent only in cases involving the use of nickel hydroxide powders having particle sizes less than 20 μm.

In conflict with the advantages of finely ground standard nickel hydroxide is the danger that, during operation of the cell, especially during charge/discharge cycling and during persistent overcharging, individual mass particles become detached from the positive electrode. As a result, there is a slow build-up of a short-circuit connection to the negative electrode. An open-pore separator of approximately 0.2 mm in thickness and composed of a fibrous nonwoven material having a pore size of approximately 100 to 300 μm, such as is at present normally used in button cells, is incapable of preventing this migration of the mass particles. As a result, failure of the cell often occurs.

Due to their fineness, the spherical nickel hydroxide particles of the present invention are no more prevented from penetrating conventional separators than are the post-ground standard materials. In both cases, an effective remedy has been found to be the use of a microporous separator material in the form of a polyethylene or polypropylene membrane having open pores with a diameter smaller than the particle sizes which are to be encountered (i.e., between 5 and 20 μm). Positive nickel hydroxide electrodes composed of finely divided material are therefore preferably used in conjunction with a microporous separator to prevent the potential for short-circuiting. At the same time, due to better space utilization, the combination of such a separator with the finely divided spherical Ni(OH)$_2$ particles of the present invention is significantly more advantageous than the use of a corresponding separator with post-ground standard materials.

FIG. 1 illustrates a conventionally constructed button storage battery 1. The storage battery 1 includes a basin-shaped lower section 2 for containing a positive electrode 3 (with nickel hydroxide particles of a spherical shape), and a lid section 4 which encloses a negative electrode 5 (composed of a pressed alloy powder having a hydrogen storage capacity), a contact spring 6, a sealing ring 7 and a separator 8.

Figure 2A:
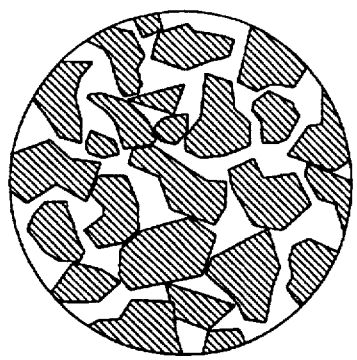
FIG. 2a diagrammatically shows a conventional (production) nickel hydroxide powder.
Figure 2B:
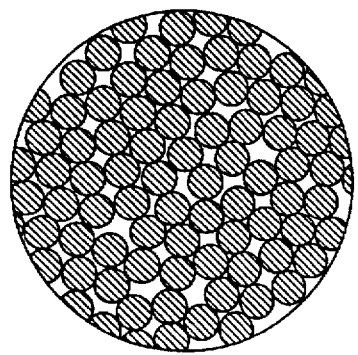
FIG. 2b diagrammatically shows a nickel hydroxide powder having the spherical particles of the present invention.

FIGS. 2a and 2b reveal the influence of the morphology of the nickel hydroxide particles on the space filled by the positive pressed powder tablet, which leads to the improved result of the present invention. In each case, FIGS. 2a and 2b show a subregion Z of the positive electrode of FIG. 1, on a considerably enlarged scale.

Referring to FIG. 2a, and because of the irregular shape of the particles in a conventional nickel hydroxide mass, significant dead spaces remain in the positive electrode 3 after its pressing. In contrast, and referring now to FIG. 2b, the uniform and smooth shape of spherical particle surfaces, combined with an optimally adjusted particle-size distribution, favors a much higher packing density. Resulting from the use of spherical nickel hydroxide particles, the electrode volume is substantially better utilized than is possible with a Ni(OH)$_2$ material having irregular particle surfaces.

Figure 3:
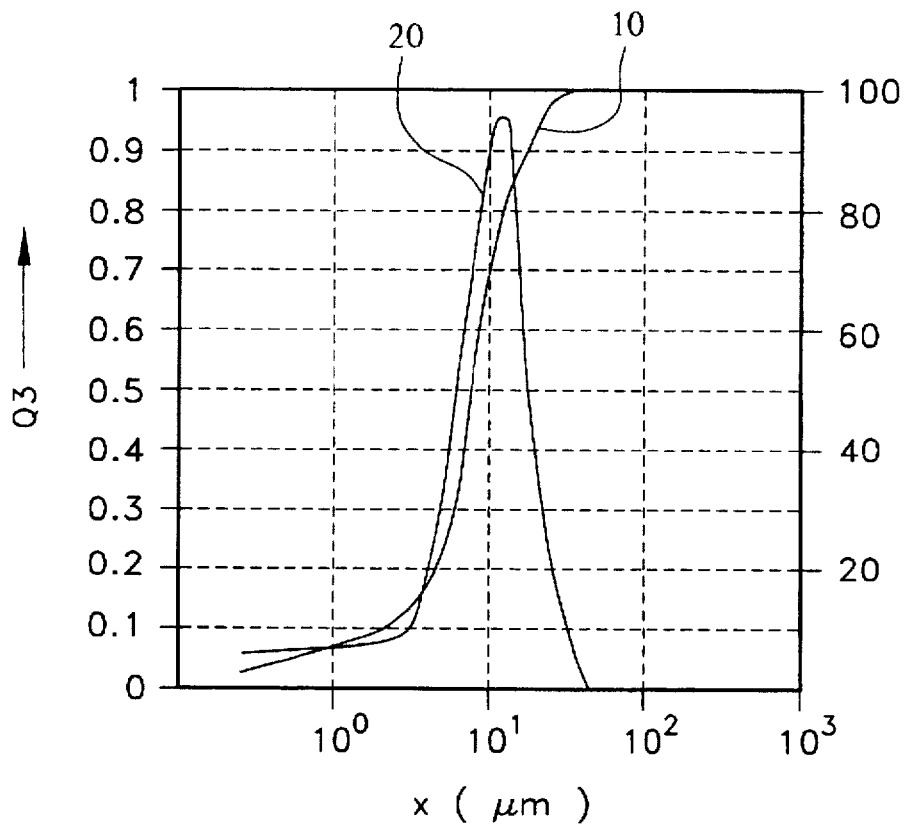
FIG. 3 is a graph showing a particle-size distribution of nickel hydroxide powder having spherical particles.

Referring to the volume distribution diagram of FIG. 3, the cumulative curve 10 shows the total volume distribution of the spherical Ni(OH)$_2$ powder (cumulative distribution Q3) as a function of particle size (x in μm). The fraction of the total volume which is occupied by particles which are equal to this size or smaller is deduced from the curve for each particle size (x) selected. Thus, it can also be seen that the spherical powder, as a whole, is composed only of particles with a size which does not exceed 30 μm.

The curve 20 is derived from the cumulative curve 10, and shows that the particle-size distribution has a maximum in a range of from 10 to 20 μm, and likewise has a width, at half maximum, of approximately 10 to 20 μm. This signifies a maximum frequency of the spherical particles within this narrow size spectrum. The substantial requirements for an optimum packing density (i.e., also for optimum space utilization) therefore exist.

Figure 4:
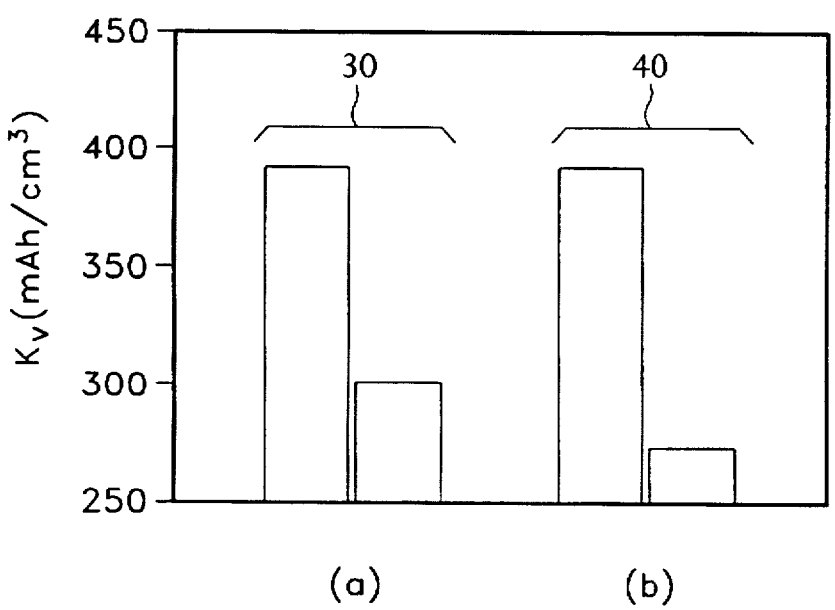
FIG. 4 is a graph showing specific volumetric capacities of pressed powder electrodes composed of a nickel hydroxide with spherical particles, as compared with conventional nickel hydroxide.

The extremely favorable volumetric capacity of a button cell electrode using spherical nickel hydroxide powder in accordance with the present invention, as compared with a conventional pressed powder electrode, is shown in FIG. 4. The specific capacities $K_v$ (mAh/cm$^3$) per unit volume are made obvious by means of bar diagrams showing the state of the cell immediately after it is filled with an electrolyte (the curves 30) and after 100 cycles (the curves 40), respectively.

In contrast to the electrodes of the present invention, pressed electrodes composed of a conventional nickel hydroxide (e.g., particle sizes of from 50 to 300 μm) are subject to spontaneous swelling as soon as they come into contact with the electrolyte. By filling the pore system of the conventional electrodes with electrolyte, an increase in the electrode height amounting to up to 25% can result. This can result in a corresponding drop in volumetric capacity. Whereas the volumetric capacity of fresh conventional electrodes has already dropped to approximately 300 mAh/cm$^3$ at the beginning of their cyclic operation (see the right-hand bar at 30), the initial capacity of the positive electrodes composed of spherical Ni(OH)$_2$ powder particles is virtually 400 mAh/cm$^3$ (see the left-hand bar at 30).

After 100 cycles, the volumetric capacity of the conventional electrodes has dropped still further, to approximately 270 mAh/cm$^3$ (see the right-hand bar at 40). On the other hand, the electrodes of the present invention remain virtually unaltered, exhibiting the same high capacity level of 400 mAh/cm$^3$ (see the left-hand bar at 40). This is at the same time evidence of the dimensional stability of such electrodes, which is explained by the better space utilization of the spherical particles, or their lower volume requirements.

Because of the absence of a tendency to swell, pressed electrodes composed of spherical particles provide an important precondition for increasing the volumetric capacity in button cells. On the other hand, allowance must be made for the increase in volume which occurs in the case of nonspherical standard materials, even in constructing the cell. Accordingly, an externally specified volume can be utilized only to a rather limited extent.

The powder of spherically shaped nickel hydroxide particles is available commercially from Tanaka Chemical Laboratories, Co., Ltd., Osaka, Japan.

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. A gas-tight, sealed alkaline storage battery formed as a button cell having positive and negative electrodes separated by a separator and disposed in a cell casing, wherein the positive electrode includes a dry pressed tablet having an active material formed from mass conglomerates comprised of: a) spherically shaped nickel hydroxide particles of sizes not exceeding 30 μm, a particle size distribution maximum in the range from 10 to 20 μm and a width at half maximum of 10 to 20 μm, and a pycnometric density from 3.3 g/cm$^3$ to 3.9 g/cm$^3$; and b) a powdered plastic binder;

wherein the mass conglomerates of the positive electrode are of sizes between 100 μm and 1000 μm and are prepared by granulating the mass conglomerates before being dry pressed into the tablet;

and wherein the separator is a microporous membrane of polyethylene or polypropylene having pore diameters of a size between 5 and 20 μm.

2. The gastight, sealed alkaline storage battery of claim 1 wherein the battery is a nickel/hydride storage battery.

3. The gastight, sealed alkaline storage battery of claim 1 wherein a majority of the particles have a size of from 5 to 20 μm.

4. The gastight, sealed alkaline storage battery of claim 3 wherein a majority of the particles have a size of from 10 to 15 μm.

5. The gastight, sealed alkaline storage battery of claim 3 wherein the mixture comprises particles of a size of from 5 to 20 μm in admixture with particles of a mean particle size from 1 to 5 μm which are not of a spherical shape.

6. The gastight, sealed alkaline storage battery of claim 1 wherein the mass mixture includes an addition of metallic nickel or metallic cobalt.

7. The gastight, sealed alkaline storage battery of claim 4 wherein the mass mixture further includes an addition of cobalt hydroxide.

8. The gastight, sealed alkaline storage battery of claim 1 wherein the negative electrode is comprised of a hydrogen storage alloy.

9. The gastight, sealed alkaline storage battery of claim 1 wherein the hydrogen storage alloy is a MmNi$_5$ alloy containing a misch metal.

10. The gastight, sealed alkaline storage battery of claim 7 wherein the mass conglomerate includes 3 to 10% by weight of CoO;

2 to 10% by weight of Co$_{met}$;

20 to 50% by weight of Ni$_{met}$; and 0.5 to 3% by weight of a plastic binder, with a remainder to 100% by weight of Ni(OH)$_2$.

11. A gas tight, sealed alkaline storage button cell battery having positive and negative electrodes separated by a separator and disposed in a cell casing, wherein the positive electrode includes a dry pressed tablet having an active material formed from mass conglomerates comprised of: a) spherically shaped nickel hydroxide particles of sizes not exceeding 30 μm, and a pycnometric density from 3.3 g/cm$^3$ to 3.9 g/cm$^3$; and b) a powdered plastic binder;

the mass conglomerates being granulated and are prepared by granulating the mass conglomerates before being dry pressed into the tablet;

and wherein the separator is a microporous polyethylene or polypropylene membrane having pore diameters of a size between 5 and 20 μm.

12. The gastight, sealed alkaline storage battery of claim 11 wherein a majority of the particles have a size of from 5 to 20 μm.

13. The gastight, sealed alkaline storage battery of claim 12 wherein a majority of the particles have a size of from 10 to 15 μm.

14. The gastight, sealed alkaline storage battery of claim 12 wherein the mixture comprises particles of a size of from 5 to 20 μm in admixture with particles of a mean particle size from 1 to 5 μm which are not of a spherical shape.

15. The gastight, sealed alkaline storage battery of claim 11 wherein the battery is a nickel/hydride storage battery.

16. The gastight, sealed alkaline storage battery of claim 11 wherein the negative electrode is comprised of a hydrogen storage alloy.

17. The gastight, sealed alkaline storage battery of claim 16 wherein the hydrogen storage alloy is a MmNi$_5$ alloy containing a misch metal.

18. The gastight, sealed, alkaline storage battery of claim 1 in which the particle size distribution is as shown by curve 20 in FIG. 3.

19. The gastight, sealed, alkaline storage battery of claim 11 in which the particle size distribution is as shown by curve 20 in FIG. 3.

* * * * *